United States Patent
Shook et al.

(10) Patent No.: US 12,301,157 B2
(45) Date of Patent: *May 13, 2025

(54) POWER TOOL RECEIVING DIFFERENT CAPACITY BATTERY PACKS

(71) Applicant: Black & Decker Inc., New Britain, CT (US)

(72) Inventors: Christopher W. Shook, Bel Air, MD (US); John D. Cox, Lutherville, MD (US); Barak N. Gohn, Shrewsbury, PA (US); Jason K. Leh, Shrewsbury, PA (US); Wing W. Lin, Bel Air, MD (US); Jason D. McKillican, Baltimore, MD (US); Marcell E. Coates, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 168 days.

This patent is subject to a terminal disclaimer.

(21) Appl. No.: 18/080,395

(22) Filed: Dec. 13, 2022

(65) Prior Publication Data

US 2023/0108641 A1    Apr. 6, 2023

Related U.S. Application Data

(63) Continuation of application No. 17/066,581, filed on Oct. 9, 2020, now Pat. No. 11,569,765.

(60) Provisional application No. 62/913,986, filed on Oct. 11, 2019.

(51) Int. Cl.
*H02P 6/28*     (2016.01)
*B25F 5/00*     (2006.01)
*H01M 10/42*    (2006.01)
*H02K 7/14*     (2006.01)
*H02K 11/00*    (2016.01)

(52) U.S. Cl.
CPC ............ *H02P 6/28* (2016.02); *B25F 5/00* (2013.01); *H01M 10/425* (2013.01); *H02K 7/145* (2013.01); *H02K 11/0094* (2013.01); *H01M 2010/4278* (2013.01); *H01M 2220/30* (2013.01)

(58) Field of Classification Search
CPC ............ H02J 7/00; H02J 7/0024; H02J 7/022; H01M 10/00; H01M 10/4207; H01M 10/4214; H01M 10/4221; H01M 10/441; H01M 10/0445; H01M 2/1022; H01M 2/1033; H01M 2220/30; H02P 25/14; H02P 29/00
See application file for complete search history.

(56) References Cited

U.S. PATENT DOCUMENTS

2005/0073282 A1 *  4/2005  Carrier ............... H01M 10/482
                                              320/106

* cited by examiner

*Primary Examiner* — Said Bouziane
(74) *Attorney, Agent, or Firm* — Amir R. Rohani

(57) ABSTRACT

A system is provided with a set of removable battery packs and a set of power tools each including a motor, a controller, and a battery receiving portion. For each power tool, the controller is configured to identify a type of battery pack coupled to the battery receiving portion and set a conduction band associated with phases of the motor or an advance angle by which phases of the motor are shifted based on the identified type of the battery pack.

14 Claims, 15 Drawing Sheets

| Battery Pack (Configuration) | C$_{TH}$ Capacitance (nF) | Battery Capacity (Ah) | Battery Impedance (Ω) |
|---|---|---|---|
| 108a (1P) | 10 | 3 | 0.12 |
| 108b (2P) | 20 | 6 | 0.06 |
| 108c (3P) | 40 | 9 | 0.03 |
| 108d (2P) | 60 | 8 | 0.04 |

FIG. 7

| Tool | Stator Size (D x L) | Coil Wires | Motor Impedance (Ω) |
|---|---|---|---|
| Circular Saw 102a | 61 x 30 | 12 turns x 1.12mm D | 0.007 |
| Recip Saw 102b | 61 x 25 | 14 turns x 1.12mm D | 0.007 |
| Drill 102c | 48 x 25 | 17 turns x 0.85 mm D | 0.017 |
| Grinder 102d | 51 x 25 | 15 turns x 0.90 mm D | 0.013 |

FIG. 8

| Tool | CBAA for Pack 108c (3P / 9Ah) | CBAA for Pack 108d (2P / 8Ah) | CBAA for Pack 108b (2P / 6Ah) | CBAA for Pack 108a (1P / 3Ah) |
|---|---|---|---|---|
| Circular Saw 102a | 150/45 | 150/45 | 120/30 | 120/30 |
| Recip Saw 102b | 160/50 | 150/45 | 140/40 | 120/30 |
| Drill 102c | 160/50 | 160/50 | 150/45 | 140/40 |
| Grinder 102d | 150/45 | 140/40 | 140/40 | 130/35 |

FIG. 13

POWER TOOL RECEIVING DIFFERENT CAPACITY BATTERY PACKS

CROSS-REFERENCE TO RELATED APPLICATION

This application is a continuation application of U.S. patent application Ser. No. 17/066,581, filed Oct. 9, 2020, which claims the benefit of U.S. Provisional Patent Application No. 62/913,986 filed Oct. 11, 2019, both of which are incorporated herein by reference in their entireties.

FIELD OF THE DISCLOSURE

The present disclosure relates to a power tool or a power tool system capable of receiving battery packs having different ampere-hour capacities.

BACKGROUND

Cordless power tools may be operated using a removable and rechargeable battery pack. The battery pack typically includes a series of lithium-based battery cells electrically connected in series to provide a total rated voltage greater than the rated voltage of individual battery cells. In an example, a string of five battery cells may be connected in series to provide the battery pack with a rated (maximum) voltage of approximately 20V and a nominal voltage of approximately 18V. The strings of battery cells may be connected in parallel to provide a rated capacity greater than the rated capacity of individual battery cells. Battery cell capacity is a measure (typically in Ampere-hours) of the charge stored in the battery cell and represents the maximum amount of energy that can be extracted from the battery cell. In an example, two strings of 3 A.h. cells may be connected in parallel inside the battery pack to provide the battery pack with a rated capacity of 6 A.h.

Battery packs having different rated capacities may be provided for powering a variety of power tools having different performance and power characteristics. Conventionally, a power tool designed to operate with a low capacity battery pack has often been deemed unsuitable and inefficient for use with a high capacity battery pack as it does not utilize the full power capability of the battery pack. Similarly, a power tool designed to operate with a high capacity battery pack is deemed unsuitable for use with a low capacity battery pack as its high current draw is incompatible with and potentially harmful to the battery pack. What is needed is a system for controlling and configuration the power tools in a way to allow utilization of battery packs having different rated capacities with a wide range of power tools having different power and performance characteristics with optimal efficiency.

SUMMARY

In an aspect of this disclosure, a system is provided including a set of removable battery packs each including a set of battery cells; and a set of power tools each including a motor, a controller, and a battery receiving portion. In an embodiment, each power tool, the controller is configured to identify a type of battery pack coupled to the battery receiving portion and limit a maximum amount of electric current drawn from the battery pack by the motor based on the identified type of the battery pack. In an embodiment, the greater a ratio of an impedance of the motor to an impedance of the battery pack, the less the controller limits the maximum amount of electric current drawn from the battery pack such that for a given battery pack of the set of removable battery packs, the lower the impedance of the motor, the more current the motor draws from the given battery pack.

In an embodiment, for each power tool of the set of power tools, the controller controls a drive mechanism of the motor over conduction bands associated with the phases of the motor. In an embodiment, the controller is configured to set the conduction band to a first value when receiving a first battery pack of the set of removable battery packs and to a second value when receiving a second battery pack of the set of removable battery packs.

In an embodiment, the first battery pack has a higher rated capacity than the second battery pack and the first value is greater than the second value such that current draw from the first battery pack is less limited than current draw from the second battery pack.

In an embodiment, in a first power tool of the set of power tools, the controller sets the conduction band to the second value of approximately equal to 120 degrees when receiving the second battery pack and to the first value of approximately 140 to 160 degrees when receiving the first battery pack. In a second power tool of the set of power tools, the controller sets the conduction band to the second value of greater than 120 degrees when receiving the second battery pack and to the first value of approximately 140 to 160 degrees when receiving the first battery pack.

In an embodiment, for each power tool of the set of power tools, the controller controls a drive mechanism of the motor over a conduction bands associated with the phases of the motor, and the controller is configured to set an advance angle by which each phase of the motor is shifted to a first value when receiving the a first battery pack of the set of removable battery packs and to a second value when receiving a second battery pack of the set of removable battery packs.

In an embodiment, in a first power tool of the set of power tools, the controller sets the advance angle to the first value of approximately equal to 30 degrees when receiving the second battery pack and to the first value of approximately 40 to 50 degrees when receiving the first battery pack. In a second power tool of the set of power tools, the controller sets the advance angle to the second value of greater than 30 degrees when receiving the second battery pack and to the first value of approximately 40 to 50 degrees when receiving the first battery pack.

According to an aspect of the invention, a power tool set is provided including a first power tool comprising a first motor having a first motor impedance, a first controller, and a first battery receptacle; a second power tool comprising a second motor having a second motor impedance that is greater than the first motor impedance, a second controller, and a second battery receptacle; a first battery pack having a first battery impedance; and a second battery pack having a second battery impedance that is greater than the first battery impedance. In an embodiment, each of the first and second battery receptacles are capable of receiving one of the first battery pack and the second battery pack, and each of the first and second controllers is configured to control a current draw such that each of the first and second motors is more limited in drawing current from the second battery pack than from the first battery pack, the first motor is more limited than the second motor when drawing current from the first battery pack, and the first motor is more limited than the second motor when drawing current from the second battery pack.

In an embodiment, the first controller controls a drive mechanism of the first motor over conduction bands associated with phases of the first motor, and the first controller is configured to set the conduction band to a first value when receiving the first battery pack and to a second value that is smaller than the first value when receiving the second battery pack.

In an embodiment, the first value is approximately greater than or equal to 130 degrees of conduction and the second value is approximately 120 degrees of conduction.

In an embodiment, the second controller controls a drive mechanism of the second motor over conduction bands associated with phases of the second motor, and the second controller is configured to set the conduction band to a third value when receiving the first battery pack and to a fourth value that is smaller than the third value but greater than the second value when receiving the second battery pack.

In an embodiment, the first controller controls a drive mechanism of the first motor over conduction bands associated with phases of the first motor, and wherein the first controller is configured to set an advance angle by which each phase of the first motor is shifted to a first value when receiving the first battery pack and to a second value that is smaller than the first value when receiving the second battery pack.

In an embodiment, the first value is approximately greater than or equal to 40 degrees of phase shift and the second value is approximately 30 degrees of phase shift.

In an embodiment, the second controller controls a drive mechanism of the second motor over conduction bands associated with phases of the second motor, and the second controller is configured to set an advance angle by which each phase of the second motor is shifted to a third value when receiving the first battery pack and to a fourth value that is smaller than the third value but greater than the second value when receiving the second battery pack.

According to an aspect of the invention, a power tool is provided including a housing; a motor disposed within the housing, the motor including a stator having phases and a rotor rotatably driven relative to the stator; a battery receptacle arranged to be selected and removably coupled to one of a first battery pack having a first rated capacity and a second battery pack having a second rated capacity higher than the first rated capacity; a power switch circuit disposed between the battery receptacle and the motor; and a controller that controls the power switch circuit to drive the motor over conduction bands associated with the phases of the stator. In an embodiment, the controller is configured to set at least one of the conduction band or an advance angle by which each phase of the motor is shifted to a first value when receiving the first battery pack and to a second value when receiving the second battery pack, where the second value is greater than the first value such that current draw from the first battery pack is more limited than current draw from the second battery pack.

BRIEF DESCRIPTION OF THE DRAWINGS

The drawings described herein are for illustrative purposes only of selected embodiments and not all possible implementations and are not intended to limit the scope of the present disclosure.

FIG. 7 is a table depicting different capacitance, capacity, and impedance values for different battery packs, according to an embodiment;

FIG. 8 is a table depicting different motor size and impedances used in different power tools, according to an embodiment;

FIG. 13 is a table depicting different conduction band/ angle advance values for different capacity battery packs, according to an embodiment;

Corresponding reference numerals indicate corresponding parts throughout the several views of the drawings.

DETAILED DESCRIPTION

Example embodiments will now be described more fully with reference to the accompanying drawings.

Figure 1:
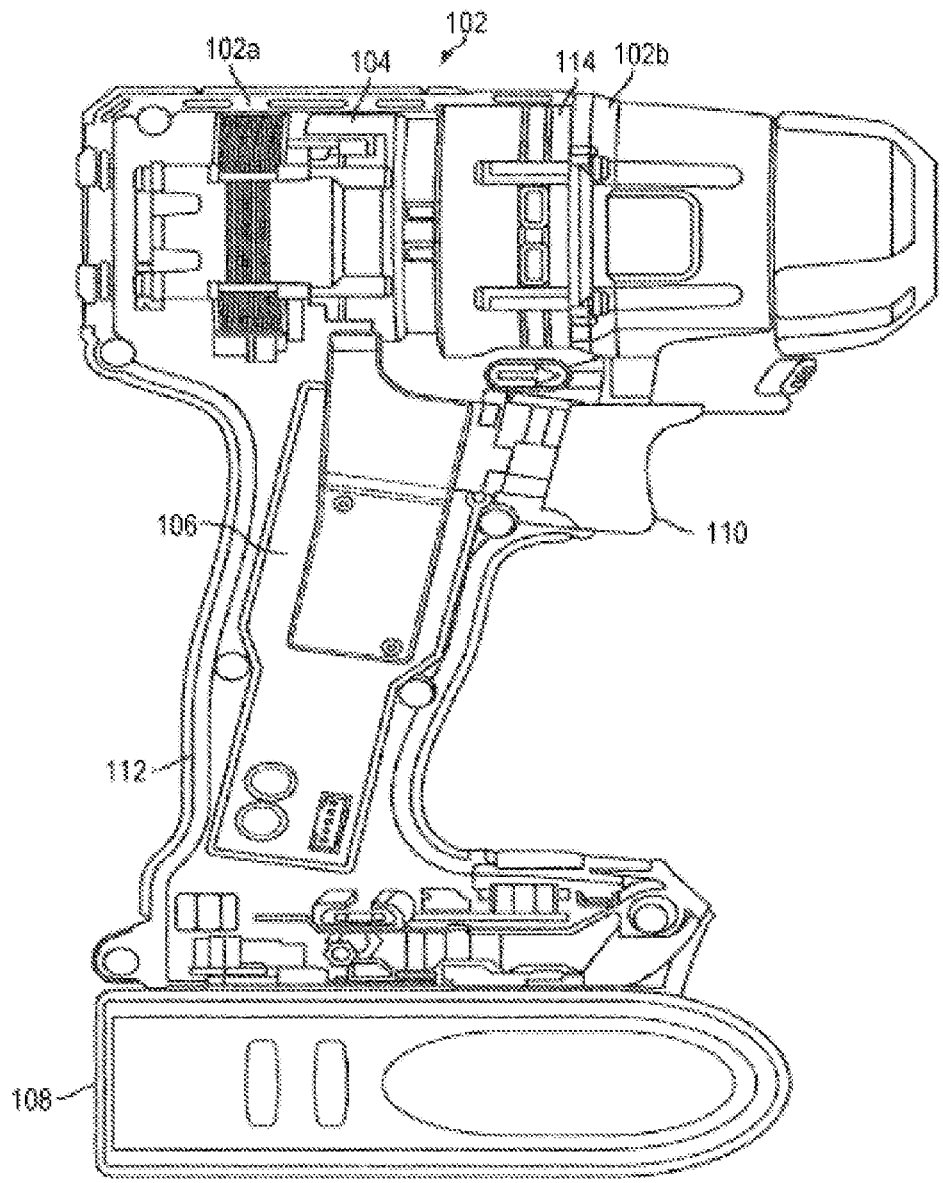
FIG. 1 is a cross-sectional view of an example power tool according to an embodiment.

With reference to the FIG. 1, a power tool 100 constructed in accordance with the teachings of the present disclosure is illustrated in a longitudinal cross-section view. The power tool 100 in the particular example provided may be a drill or impact driver, but it will be appreciated that the teachings of this disclosure is merely exemplary and the power tool of this invention could be a hammer, grinder, impact wrench, circular saw, reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a tool housing 102, a motor assembly 104, a control module 106, an input unit (e.g., a variable speed trigger) 110, a transmission assembly 114, an output spindle, and a chuck that can be coupled for rotation with the output spindle.

According to an embodiment, the motor 104 is received in the housing 102. The motor can be any type of motor and may be powered by an appropriate power source (electricity, pneumatic power, hydraulic power). In the particular example provided, the motor is a brushless DC electric motor and is powered by a battery pack 108. An input unit 110 is mounted in the handle 112 of the housing 102. The input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit and provide respective inputs of these functions to the control unit 106. The control unit 106, which is coupled to the input unit 110, supplies the drive signals to the motor. In the exemplary embodiment of the invention, the control unit 106 is provided in the handle 112.

Construction details of the brushless motor 104 or the control unit 106 are beyond the scope of this disclosure, and can be found in co-pending International Patent Publication No. WO2011159674 by the same assignee as this application, which is incorporated herein by reference in its entirety. In an embodiment, motor 104 includes a stator provided with a series of coils that are selectively energized from the battery pack 108 and a rotor provided with a series of magnets that interact with the stator coils to cause rotation of the rotor. It is generally known that larger motor stators (i.e., ones with larger diameters and length) produce higher power outputs so long as the battery pack 108 has sufficient capacity to power the motor.

The brushless motor 104 depicted in FIG. 1 is commutated electronically by the control unit 106. The control unit 106 may include a controller, for example, a programmable micro-controller, micro-processor, or other programmable module or a non-programmable brushless control integrated circuit, configured to control supply of DC power to the motor 104 and accordingly commutate the motor 104. Alternatively, the controller may include an application-specific integrated circuit (ASIC) configured to execute commutation of the motor 104. The tool 100 is powered by a suitable power source such as the battery pack 108. It is envisioned, however, that aspects of the present disclosures can be applied to a power tool with an AC power source, which in some embodiments may further include a full-wave or half-wave rectifier to power to motor. Using the variable-speed input and other inputs from the input unit 110, the control unit 106 controls the amount of power supplied to the motor 104. In an exemplary embodiment, the control unit 106 controls the pulse width modulation (PWM) duty cycle of the DC power supplied to the motor 104.

Figure 2A:
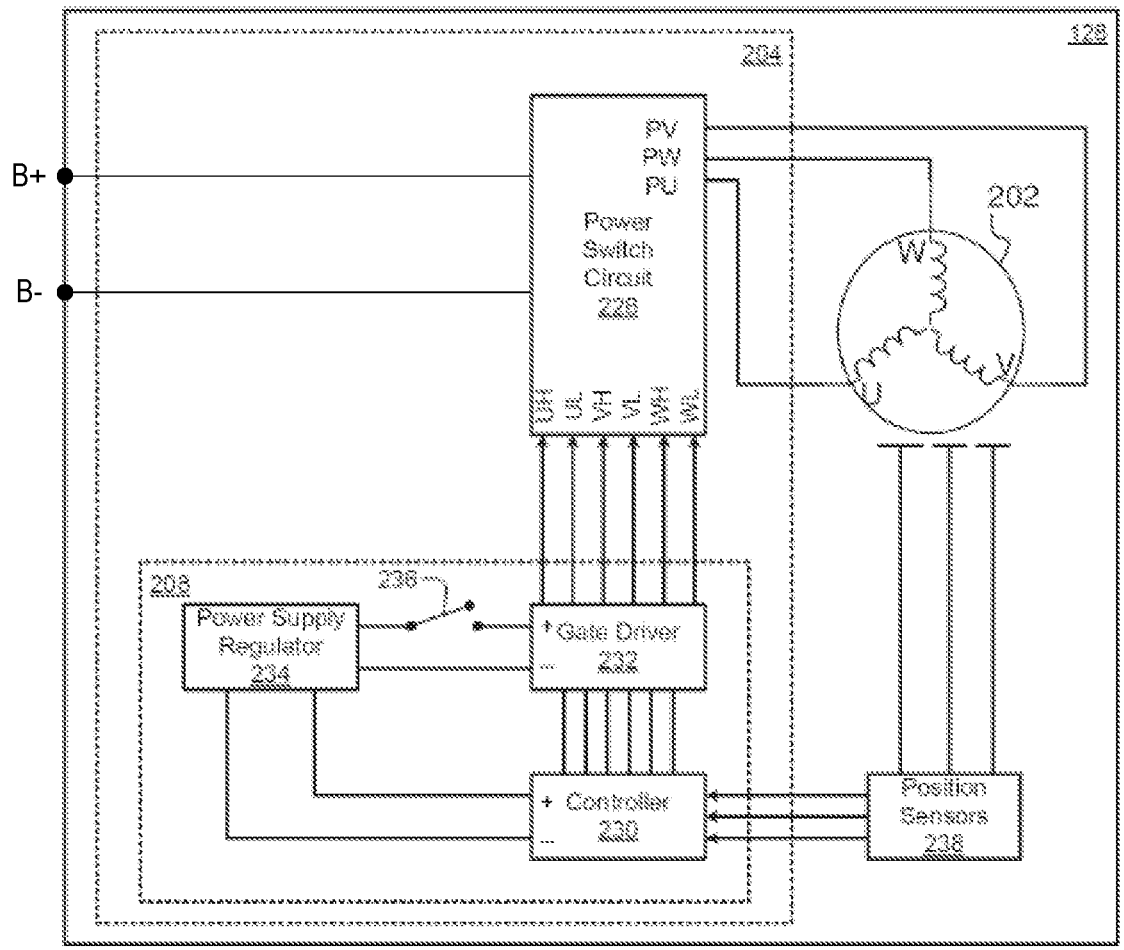
FIG. 2A is a diagram depicting are example motor control system which may be employed by a power tool, according to an embodiment.
Figure 2B:
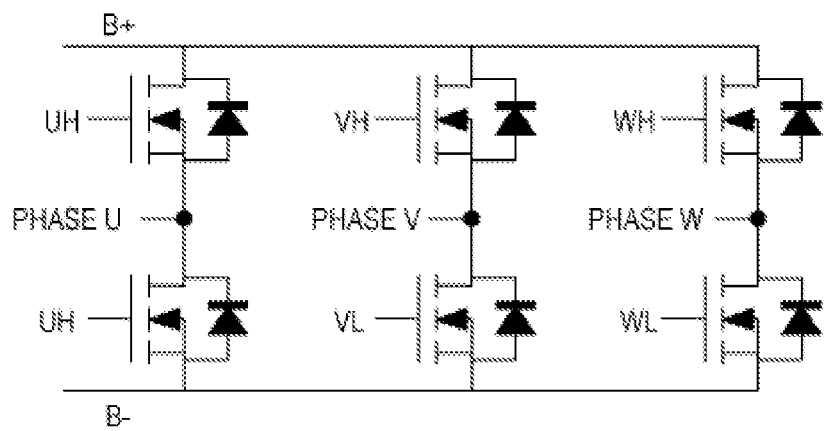
FIG. 2B is a schematic of a three-phase inverter bridge circuit, according to an embodiment.

Referring to FIGS. 2A and 2B, an example motor control system 128 that may be employed by the power tool 100 is described. In an example embodiment, the motor control system 128 includes a motor control circuit 204 to control supply of power from a power source (e.g., a battery or an AC power supply) to the BLDC motor 104. The motor control circuit 204 further includes a power switch circuit 226 that receives power from the power source and a control unit 208 that controls the supply of power from the power source to a BLDC motor 104 as further discussed below. In the context of an AC power supply, a rectifier 222 along with a capacitor 224 may be interposed between the AC power source and the power switch circuit 226.

In an example embodiment, the power switch circuit 226 may be a three-phase bridge driver circuit including six controllable semiconductor power devices (e.g., FETs, BJTs, IGBTs, etc.). FIG. 2B depicts an exemplary power switch circuit 226 having a three-phase inverter bridge circuit, according to an embodiment. As shown, the three-phase inverter bridge circuit includes three high-side FETs and three low-side FETs. The gates of the high-side FETs driven via drive signals UH, VH, and WH, and the gates of the low-side FETs are driven via drive signals UL, VL, and WL, as discussed below. In an embodiment, the sources of the high-side FETs are coupled to the drains of the low-side FETs to output power signals PU, PV, and PW for driving the BLDC motor 104.

Referring back to FIG. 2A, the control unit 208 includes a controller 230, a gate driver 232, a power supply regulator 234, and a power switch 236. In the example embodiment, the controller 230 is a programmable device arranged to control a switching operation of the power devices in power switching circuit 226. The controller 230 receives rotor rotational position signals from a set of position sensors 238 provided in close proximity to the motor 104 rotor. In one embodiment, the position sensors 238 may be Hall sensors. It should be noted, however, that other types of positional sensors may be alternatively utilized. It should also be noted that controller 230 may be configured to calculate or detect rotational positional information relating to the motor 104 rotor without any positional sensors (in what is known in the art as sensorless brushless motor control). The controller 230 also receives a variable-speed signal from variable-speed actuator (not shown) discussed above. Based on the rotor rotational position signals from the position sensors 238 and the variable-speed signal from the variable-speed actuator, controller 230 outputs drive signals UH, VH, WH, UL, VL, and WL through the gate driver 232, which provides a voltage level needed to drive the gates of the semiconductor switches within the power switch circuit 226 in order to control a PWM switching operation of the power switch circuit 226.

In the example embodiment, the power supply regulator 234 may include one or more voltage regulators to step down the voltage from the power source to a voltage level compatible for operating the controller 230 and/or the gate driver 232. In one embodiment, power supply regulator 234 may include a buck converter and/or a linear regulator to reduce the voltage of the power source to, for example, 15V for powering the gate driver 232, and down to, for example, 3.2V for powering the controller 230.

In the example embodiment, a power switch 236 may be provided between the power supply regulator 234 and the gate driver 232. The power switch 236 may be an ON/OFF switch coupled to the ON/OFF trigger or the variable-speed actuator to allow the user to begin operating the motor 104, as discussed above. The power switch 236 in this embodiment disables supply of power to the motor 104 by cutting power to the gate drivers 232. It is noted, however, that the power switch 236 may be provided at a different location, for example, between the power source and the power switch circuit 226. It is further noted that in an embodiment, the power tool 100 may be provided without an ON/OFF switch 236, and the controller 230 may be configured to activate the power devices in the power switch circuit 226 when the ON/OFF trigger (or variable-speed actuator) is actuated by the user.

Figure 3A:
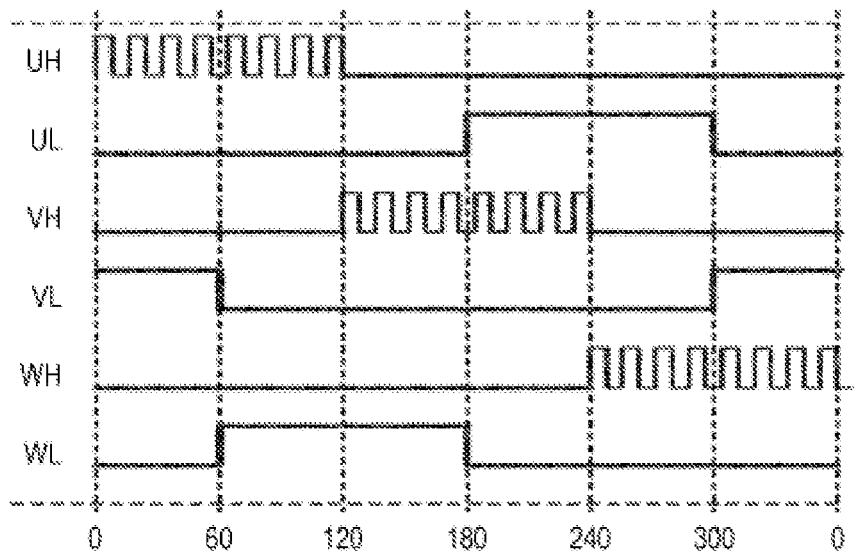
FIG. 3A is a diagram depicting an example waveform of the PWM drive sequence, according to an embodiment.

FIG. 3A depicts an exemplary waveform diagram of a pulse-width modulation (PWM) drive sequence of the three-phase inverter bridge circuit (FIG. 2B) within a full 360 degree conduction cycle. As shown in this figure, within a full 360° cycle, each of the drive signals associated with the high-side and low-side power switches is activated during a 120° conduction band ("CB"). In this manner, each associated phase of the BLDC 104 motor is energized within a 120° CB by a pulse-width modulated voltage waveform that is controlled by the control unit 208 as a function of the desired motor rotational speed. For each phase, UH is pulse-width modulated by the control unit 208 within a 120° CB. During the CB of the high-side switch, the corresponding UL is kept low. The UL signal is then activated for a full 120° CB within a half cycle (180°) after the CB associated with the UL signal. The control unit 208 controls the amount of voltage provided to the motor, and thus the speed of the motor, via PWM control of the high-side switches.

It is noted that while the waveform diagram of FIG. 3A depicts one exemplary PWM technique at 120° CB, other PWM methods may also be utilized. One such example is PWM control with synchronous rectification, in which the high-side and low-side switch drive signals (e.g., UH and UL) of each phase are PWM-controlled with synchronous rectification within the same 120° CB.

Figure 3B:
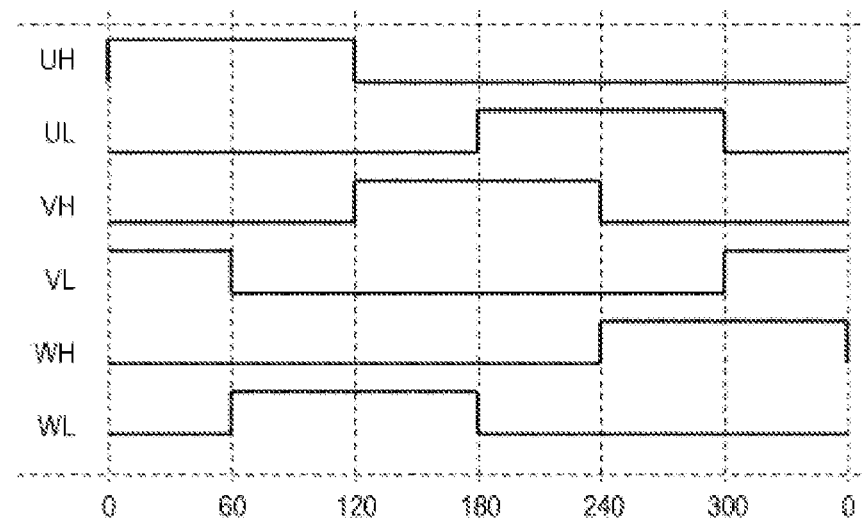
FIG. 3B is a diagram depicting an example waveform of the PWM drive sequence operating at full speed at a baseline conduction band, according to an embodiment.

FIG. 3B depicts an exemplary waveform diagram of the drive sequence of the three-phase inventor bridge discussed above operating at full-speed (i.e., maximum speed under constant-load condition). In this figure, the three high-side switches conduct at 100% PWM duty cycle during their respective 120° CBs, providing maximum power to the motor to operate at full-speed.

In a BLDC motor, due to imperfections in the commutation of the power switches and the inductance of the motor itself, current will slightly lag behind the back-EMF of the motor. This causes inefficiencies in the motor torque output. Therefore, in practice, the phase of the motor is shifted by an advance angle ("AA") of several degrees so the current supplied to the motor no longer lags the back-EMF of the motor. AA refers to a shifted angle Y of the applied phase voltage leading ahead a rotational EMF of the corresponding phase.

In addition, in some embodiments, the motor 104 may be an interior-permanent magnet (IPM) motor or other salient magnet motor. Salient magnet motors can be more efficient than surface-mount permanent magnet motors. Specifically, in addition to the magnet torque, a salient magnet motor includes a reluctance torque that varies as a function of the motor current (specifically, as a function of the square of the motor current), and therefore lags behind the magnet torque. In order to take advantage of this reluctance torque, the AA shifted angle Y is increased to encompass the lag of the reluctance torque. The added reluctance torque enables the salient magnet motor to produce 15 percent or more torque per amp than it would without the further shift in angle Y.

In some embodiments, AA may be implemented in hardware, where positional sensors are physically shifted at an angle with respect to the phase of the motor. Alternatively, or additionally, AA may be implanted in software, where the controller 230 is configured to advance the conduction band of each phase of the motor by the angle Y, as discussed herein.

Figure 3C:
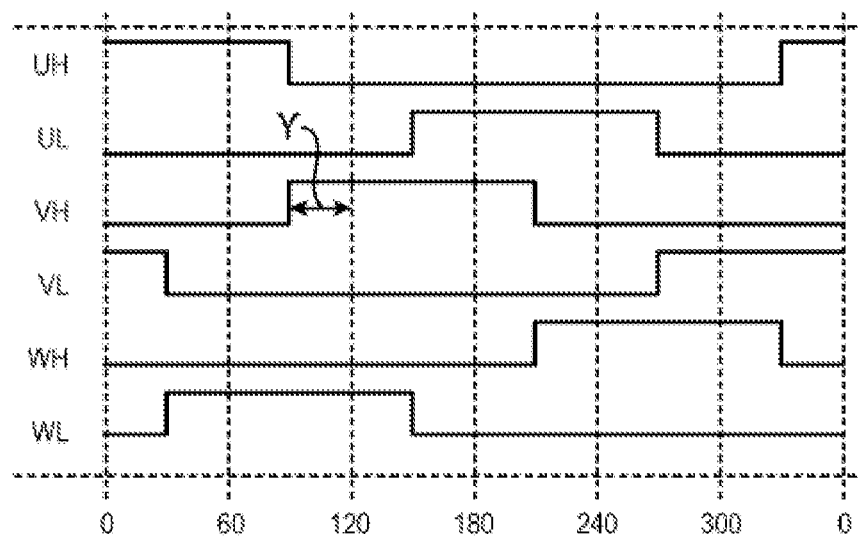
FIG. 3C is a diagram depicting an example waveform of the full-speed PWM drive sequence with a baseline angle advance, according to an embodiment.

FIG. 3C depicts the waveform diagram of the drive sequence of FIG. 3B, shown with an AA baseline value of Y=30°, according to an embodiment. In this embodiment, AA of 30 degrees is sufficient (and is commonly used by those skilled in the art) in BLDC applications to account for the current lag with respect to the back-EMF of the motor and take advantage of the reluctance torque of salient magnet motors. In an embodiment, the baseline AA value may be implemented in software or may be done mechanically, e.g., by positioning the position sensors at a 30-degree angle from the center of the magnetic field.

According to one embodiment, increasing the AA to a value greater than Y=30° can result in increased motor speed and power output. However, increasing the AA alone at a fixed CB can result in diminished efficiency. As will be understood by those skilled in the art, efficiency is measured as a function of (power-out/power-in). In an embodiment, the CB of each phase of the brushless motor may be thus be similarly increased from the baseline value of 120°, which is the CB value conventionally used by those skilled in the art, to, for example, 150° as shown in this illustrative example. As compared to a CB of 120° shown in FIG. 3A, the CB may be expanded by 15° on each end to obtain a CB of 150°. Increasing the CB to a value greater than 120° allows three of the switches in the three-phase inventor bridge to be ON simultaneously (e.g., between 45° to 75° and 105° to 135° in the illustrative example) and for voltage to be supplied to each phase of the motor during a larger conduction period. This, in effect, increases the total voltage amount being supplied to the motor 104 from the DC bus line, which consequently increases the motor speed and power output performance, as discussed below.

Figure 3D:
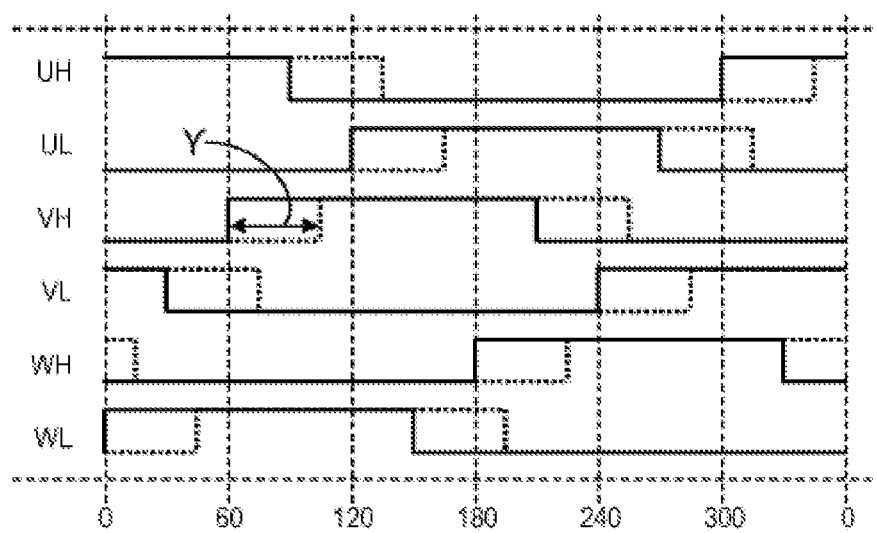
FIG. 3D is a diagram depicting an example waveform of the full-speed PWM drive sequence where the angle advance and conduction band are increased in tandem from the baseline values, according to an embodiment.

FIG. 3D depicts an embodiment of the invention where the AA of each phase of the brushless motor is also varied in tandem with and corresponding to the CB. In the illustrative example, where the CB is at 150°, the AA is set to an angle of Y=45°. In an embodiment, various CB and AA correlations may be implemented in controller 230 as a look-up table or an equation defining a functional relationship between CB and the associated AA.

An exemplary table showing various CB and associated AA values is as follows:

| CB | AA (Y') |
| --- | --- |
| 120° | 30° |
| 130° | 35° |
| 140° | 40° |
| 150° | 45° |
| 160° | 50° |
| 170° | 55° |

It is noted that while these exemplary embodiments are made with reference to CB/AA levels of 120°/30°, 140°/40°, 160°/50°, these values are merely exemplary and any CB/AA value (e.g., 162°/50.6°, etc.) may be alternatively used. Also, the correlation between AA and CB provides in this table and throughout this disclosure is merely exemplary and not in any way limiting. Specifically, while the relationship between CB and AA in the table above is linear, the relationship may alternatively be non-linear. Also, the AA values given here for each CB are by no means fixed and can be selected from a range. For example, in an embodiment, CB of 150° may be combined with any AA in the range of 35° to 55°, preferably in the range of 40° to 50°, preferably in the range of 43° to 47°, and CB of 160° may be combined with any AA in the range of 40° to 60°, preferably in the range of 45° to 55°, preferably in the range of 48° to 52°, etc. Moreover, optimal combinations of CB and AA may vary widely from the exemplary values provided in the table above in some power tool applications.

In alternative embodiments, any conduction band value may be combined with any angle advance value as suitable for a given application. For example, a CB/AA of 120/40 degrees or 160/30 degrees may be used rather than the table above to obtain higher power values.

Figure 4:
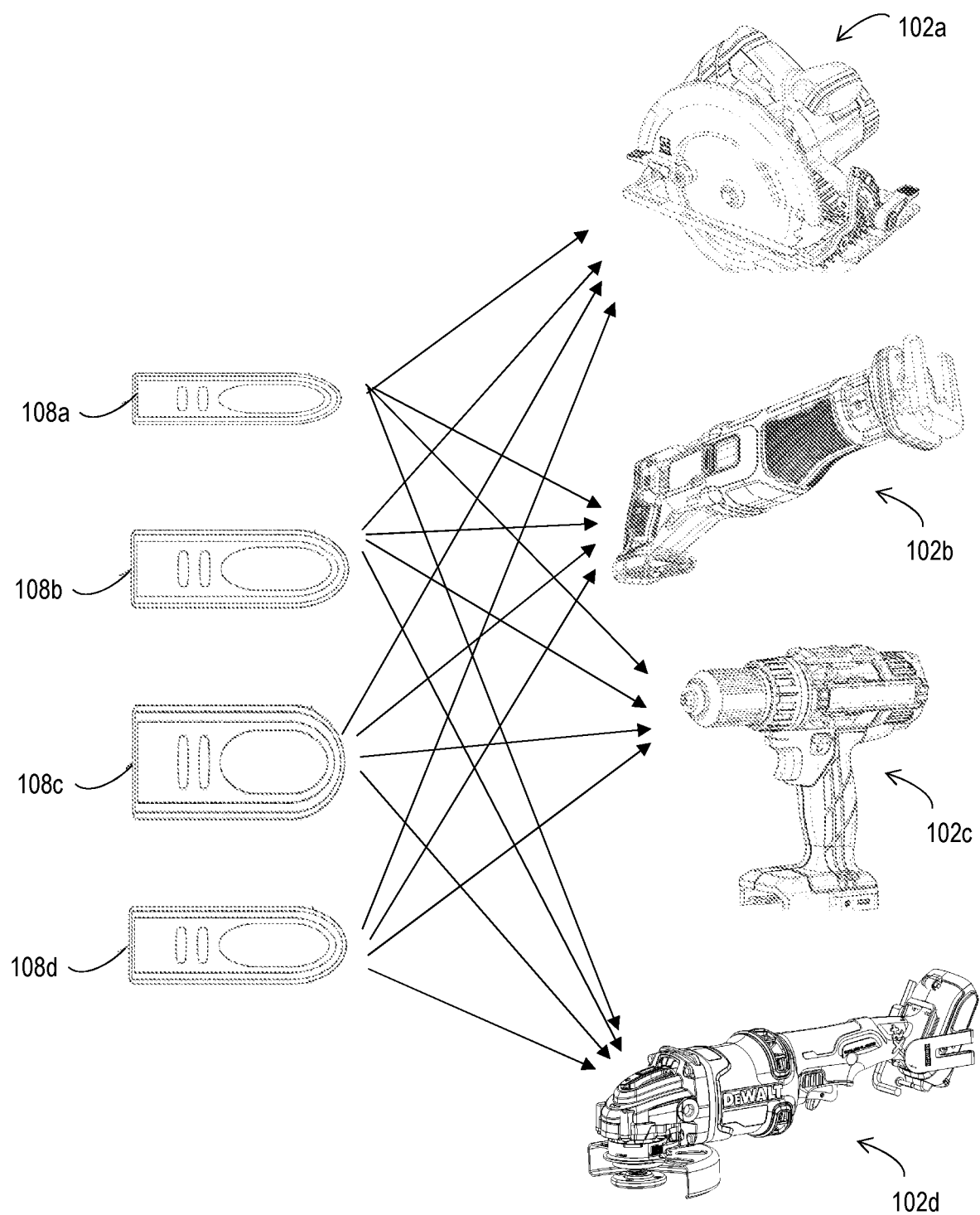
FIG. 4 is a view of the exemplary power tool receiving different capacity battery packs, according to an embodiment.

FIG. 4 is a view of a set of exemplary power tools 100a-100d receiving different capacity battery packs 108a-108d, according to an embodiment. In an embodiment, exemplary power tools 100a-100d in this figure are a circular saw, a reciprocating saw, a drill, and a grinder, respectively. Is should be understood, however, that these power tools are provided by way of example, and any other type of power tool, including, but not limited to, an impact tool, a hammer drill, a hammer, a wrench, an oscillator tool, a polisher, a cut-off tool, etc. may be used within this family of tools. Though FIG. 1 depicts one exemplary power tool 100 in detail, as is appreciated by one of ordinary skill in the art, each power tool 100a-100d may include features as shown in FIG. 1 including a housing 102, a handle 112, an input unit 110, a motor 104, and a control module 106. Further, it is appreciated by one of ordinary skill in the art that each exemplary power tool 100a-100d is constructed with a motor control system, an example of which is provided in FIGS. 2A and 2B including an exemplary motor control circuit 204 for controlling the motor 104. In an embodiment, as discussed below, each power tool 100a-100d is provided with a battery pack receptacle capable of receiving any of the battery packs 108a-108d. Further, each power tool 100a-100d includes a battery detection and identification mechanism for identification of the type of battery pack 108a-108d that it receives.

Figure 5A:
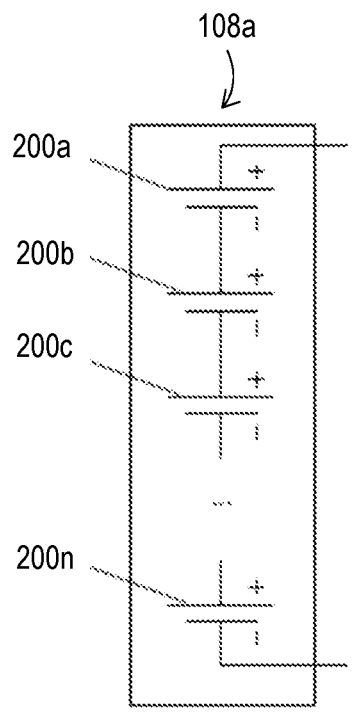
FIGS. 5A-5C depict circuit diagrams of three battery packs having different capacities and different numbers of parallel cell connections, according to an embodiment.
Figure 5B:
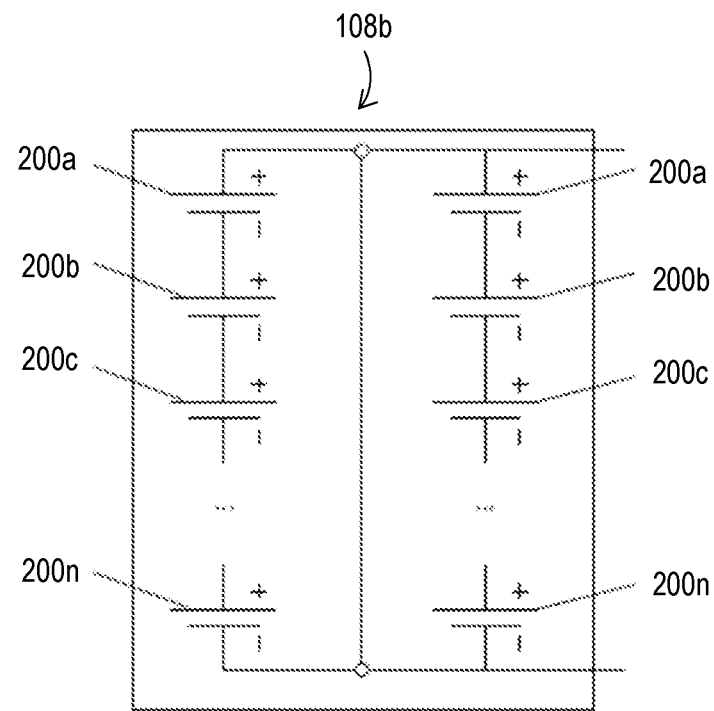
Figure 5C:
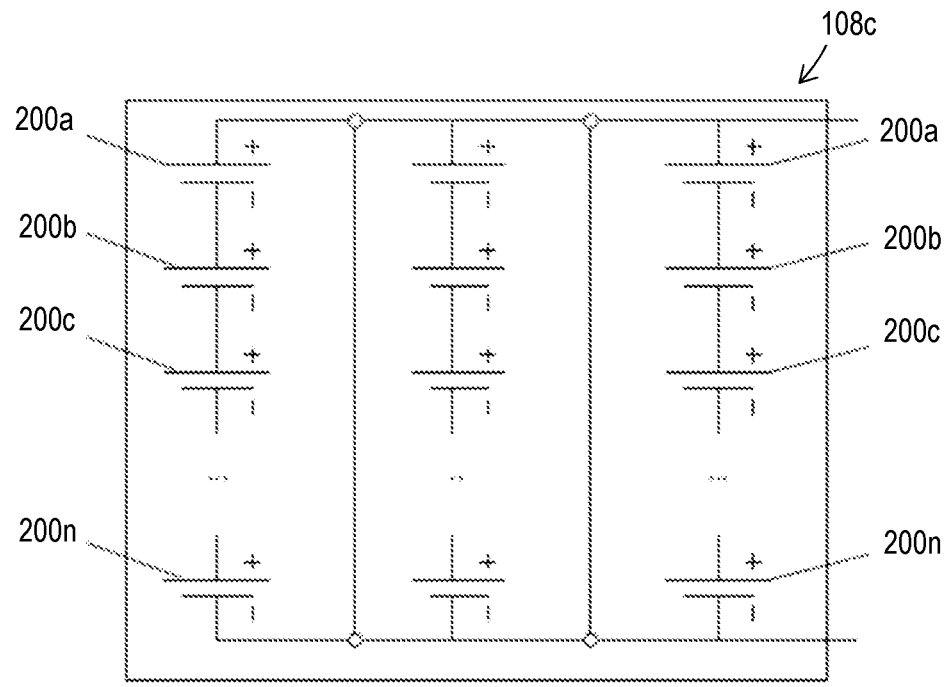

FIGS. 5A-5C depict circuit diagrams of battery packs 108a-108c, respectively, according to an embodiment.

In an embodiment, battery pack 108a is a low-capacity battery pack including a series of battery cells 200a-200n. Each battery cell 200a-200n has a lithium or lithium-ion composition having a maximum rated voltage (e.g., 4V or 4.1V) and a nominal voltage (e.g., 3.8V). The nominal voltage refers to the average state of charge below the maximum voltage within which the cells commonly operate. Low capacity battery pack 108a in this example may include five battery cells 200a-200n in series for a maximum voltage of approximately 20V and a nominal voltage of approximately 18V. In this example implementation, the battery pack 108a may have a capacity of approximately 1.5 to 3.0 Ah depending on the cell impedance.

In an embodiment, battery pack 108b is a medium-capacity battery pack including two rows of cells 200a-200n in parallel. Each row of cells 200a-200n includes the same number of cells as low-capacity battery pack 108a such that medium-capacity battery pack 108b has the same maximum rated voltage (e.g., approximately 20V) and nominal voltage (e.g., approximately 18V) as the low-capacity battery pack 108a. However, the parallel arrangement of the cells increases the capacity of the medium-capacity battery pack 108b to approximately double that of the low-capacity battery pack 108a (e.g., approximately 3.0 to 6.0 Ah), while reducing the battery pack impedance to approximately half the impedance of the low-capacity battery pack 108a.

In an embodiment, battery pack 108c is a high-capacity battery pack including three rows of cells 200a-200n in parallel. Each row of cells 200a-200n includes the same number of cells as low-capacity battery pack 108a such that high-capacity battery pack 108c has the same maximum rated voltage (e.g., approximately 20V) and nominal voltage (e.g., approximately 18V) as the low-capacity battery pack 108a and the medium-capacity battery pack 108c. However, the parallel arrangement of the cells increases the capacity of the high-capacity battery pack 108b to approximately triple that of the low-capacity battery pack 108a (e.g., approximately 4.5 to 9.0 Ah), while reducing the battery pack impedance to approximately ⅓ the impedance of the low-capacity battery pack 108a.

In an embodiment, battery pack 108d (see FIG. 4) includes the same number of parallel rows of cells as battery pack 108b, but with lower impedance battery cells. The cell battery impedance may depend upon several factors, including but not limited to, the cell chemistry, cell diameter, etc. For the purposes of this disclosure, battery pack 108a is considered a high-capacity battery pack with a capacity of approximately 5-8 Ah.

According to embodiments of the invention, battery packs 108a-d include the same rated and nominal voltages and are provided with the same terminal interface for coupling with the family of power tools 100a-100d. However, battery packs 108a-d have different ampere-hour capacities. While low, medium, and high rated capacities in these examples refer to packs with one, two and three rows of battery cells connected in parallel, it should be understood that these configurations are exemplary and battery packs with higher numbers of parallel connections may be utilized. As discussed, battery capacity relates to the number of parallel connection between the battery cells, as well as cell impedance, cell chemistry, etc. It is also noted that the capacity and impedance values provided herein are by way of example and a cell with any impedance level may be incorporated into a battery pack with any number of parallel connections. For example, a 3P battery pack may be provided with very low impedance cells to achieve a capacity of 12 Ah, 15 Ah, 18 Ah.

Figure 6:
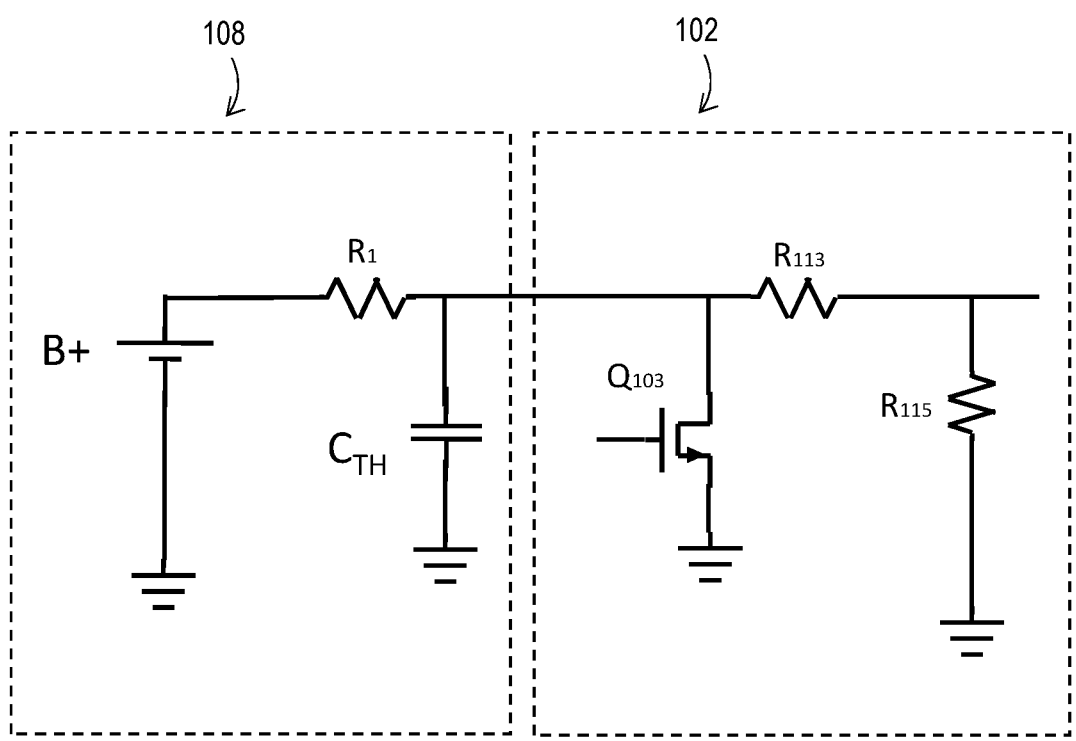
FIG. 6 is a simplified circuit diagram of a battery pack identification mechanism and the corresponding power tool ID detection mechanism, according to an embodiment.

FIG. 6 is a simplified circuit diagram of a battery pack identification mechanism and the corresponding power tool ID detection mechanism, according to an embodiment. In an embodiment, each battery pack 108 (i.e., 108a-108d) is provided with a RC circuit including a capacitor $C_{TH}$ and a resistor R1 couples to the battery cells. Each power tool 100 (i.e., 100a-100d) includes a switch Q103 provided parallel to the capacitor $C_{TH}$ that switchably discharges the capacitor $C_{TH}$ when it is switched ON. In an embodiment, the controller using the switch Q103 and waits a predetermined amount of time (e.g., 1-3 ms) to allow the capacitor $C_{TH}$ to fully discharge. Thereafter, the controller recharges the capacitor $C_{TH}$ and calculates its capacitance based on the time it takes to recharge.

FIG. 7 is a table depicting different capacitance values for different capacity battery packs 108a-d, according to an embodiment. In this example, battery configuration 1P, 2P, and 3P designate the number of parallel connections in battery pack 108a-108c. Using the calculated capacitance of $C_{TH}$, the controller identifies the battery pack identification, which is associated (among other things) with the battery pack's number of parallel connections.

FIG. 7 additionally depicts exemplary battery capacity (ampere-hours) and impedance (ms)) levels for the four battery configurations, according to an embodiment. In this example, low-capacity battery pack 108a has a 3 Ah capacity and a 120 ms) pack impedance; medium-capacity battery pack 108b has a 6 Ah capacity and a 60 ms) pack impedance; high-capacity battery pack 108c has a 9 Ah capacity and a 30 ms) pack impedance; and high-capacity battery pack 108d has an 8 Ah capacity and a 40 ms) pack impedance. As shown herein, the battery pack impedance is reduced as more parallel rows of cells are provided and/or as cell impedance is reduced.

Given the same motor control scheme and operating conditions (i.e., same load, output speed, etc.), higher capacity battery packs as described herein provide increased run-times associated with their rated ampere-hour capacity. Also, higher capacity battery packs allow the power tool motor 104 to provide a higher power output due to the lower impedance of the battery pack.

As noted above, an increase in the size of the motor 104 results in more power output given that the battery pack 108 can supply the motor 104 with sufficiently high input power. The size of the motor 104 as described herein generally defined by the outer diameter and the length of the stator. The increase in power output of the motor 104 in relation to its size is mainly due to the inverse relationship between the impedance and the size of the motor 104—namely, in general terms, the larger the motor size, the smaller its impedance. Motor impedance is affected by several factors, including but not limited to, the thickness of the stator coil wire. Since thicker coil wires have lower resistance and thus reduce motor impedance, given the same output speed, increasing the thickness of the coil wires results in higher output torque and higher output power. A larger motor (i.e., one with at least one of a larger diameter or larger length) is needed to accommodate thicker coil wires. Thus, the motor power output is directly proportional to its size and inversely proportional to its impedance.

FIG. 8 is a table depicting the motor impedance for different motors 104 utilized in four exemplary power tools 108a-d, according to an embodiment. In an embodiment, circular saws and reciprocating saws require more power for cutting operations, but also include a larger tool housing to accommodate a larger motor. In this example, the circular saw includes a motor 104 having a stator size of 61 mm diameter and 30 mm length and an impedance of 7 mΩ. The reciprocating saw has a motor 104 with the same size stator diameter, but a shorter stator length of 25 mm. However, due to reciprocating saw motor having a higher number of turns of coil wire, it has approximately the same impedance as the circular saw motor. The grinder has a smaller motor 104 with 51 mm diameter and 25 mm length stator and thinner coil wires, and thus a higher impedance of 13 mΩ. The drill has an even a smaller motor 104 with a 48 mm diameter and 25 mm length stator. The drill has a yet higher impedance of 17 mΩ. As seen here, all other variables (including motor output speed) being equal, the smaller the motor size, the larger its impedance.

As noted above, variable CBAA control is an effective method of maximizing power output from a given power supply. To maximize the power output of a power tool, common sense of those skilled in the art dictates providing a larger motor 104 as allowed by the size of the power tool housing and operating the motor 104 with increased levels of CBAA, e.g. 160/50 degrees, irrespective of the motor size in relation to the battery capacity. Increasing the operating CBAA level of the motor 104 to, for example, 150/45 degrees or 160/50 degrees produces higher power output from the motor 104 from any of the battery packs 108a-d described above.

It was found by the inventors of this application, however, that relative impedances of the battery pack and the motor effect the performance of the battery pack when operating at high CBAA levels. Specifically, it was found that operating a low impedance motor at high CBAA levels using a high impedance battery pack can push the battery pack beyond its operating limits and cause it to overheat too quickly.

To overcome this problem, according to an embodiment of the invention, the conduction band and angle advance for a given motor 104 is calculated as a function of the ratio of the motor impedance to the battery pack impedance. The motor impedance as a percentage of the battery pack impedance is a value typically in the range of 5% to 40%, as seen in the tables of FIGS. 7 and 8. The higher the ratio of motor impedance to battery pack impedance, the greater the threshold value of both the conduction band and the advance angle may be. This threshold value designates the conduction band and advance angle values above which the motor 104 draws too much current from the battery pack beyond the battery pack's rated capacity, causing the battery pack to overheat in normal operating conditions.

Figure 9:
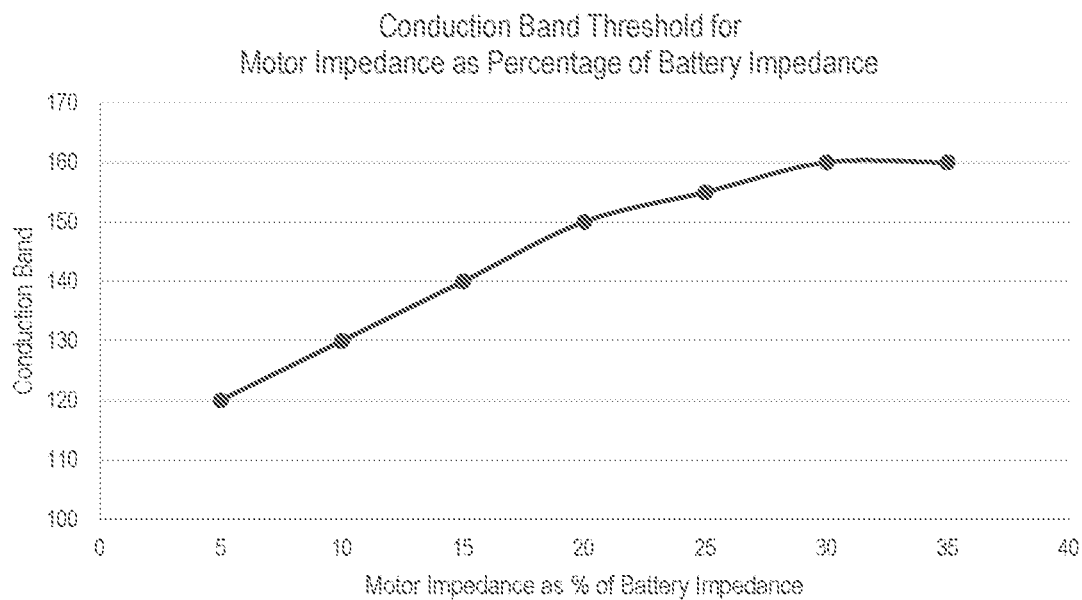
FIG. 9 is a graph depicting conduction band threshold values relative to the motor impedance as a percentage of battery impedance, according to an embodiment.

FIG. 9 is a graph depicting conduction band threshold values relative to the motor impedance as a percentage of battery impedance, according to an embodiment. In an embodiment, the conduction band threshold may be increased from the baseline value of 120 degrees up to a maximum value of 160 degrees as the ratio of motor impedance to battery pack impedance increases. Thus, for a larger (lower impedance) motor 104, the conduction band threshold is maintained at or close to the baseline value of 120 degrees when in use with lower capacity (higher impedance) battery packs, but is increased to higher values of up to 160 degrees when in use with higher capacity (lower impedance) battery packs.

Figure 10:
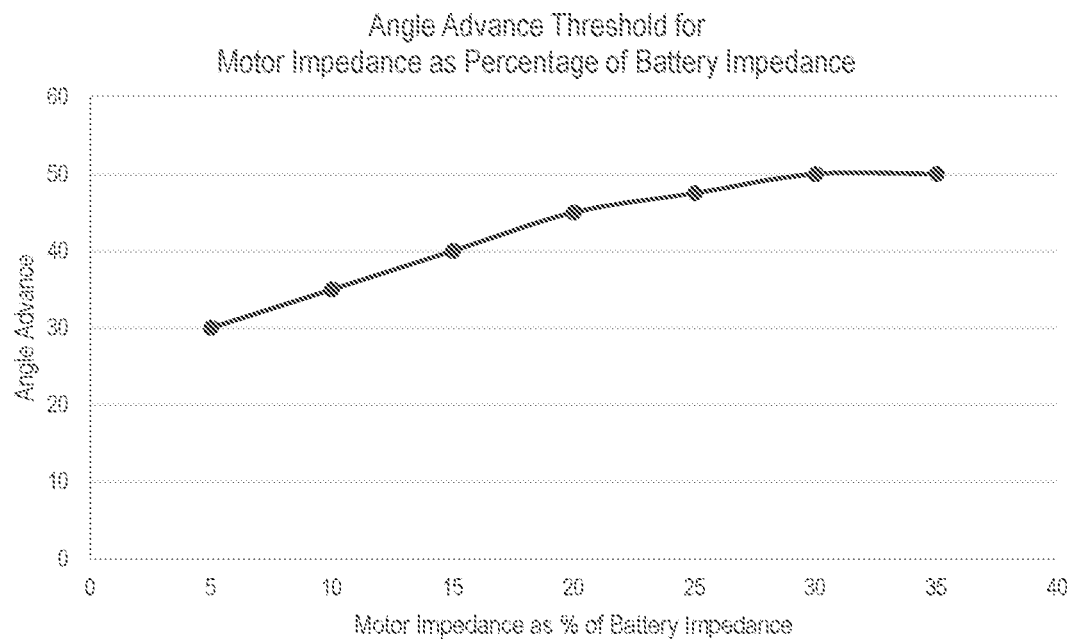
FIG. 10 is a graph depicting angle advance threshold values relative to the motor impedance as a percentage of battery impedance, according to an embodiment.

FIG. 10 is a graph depicting angle advance threshold values relative to the motor impedance as a percentage of battery impedance, according to an embodiment. In an embodiment, the advance angle threshold may be increased from a baseline value of 30 degrees up to a maximum value of 50 degrees as the ratio of motor impedance to battery pack impedance increases. Thus, for a larger (lower impedance) motor 104, the advance angle threshold is maintained at or close to the baseline value of 30 degrees when in use with lower capacity (higher impedance) battery packs, but is increased to higher values of up to 50 degrees when in use with higher capacity (lower impedance) battery packs.

Figure 11:
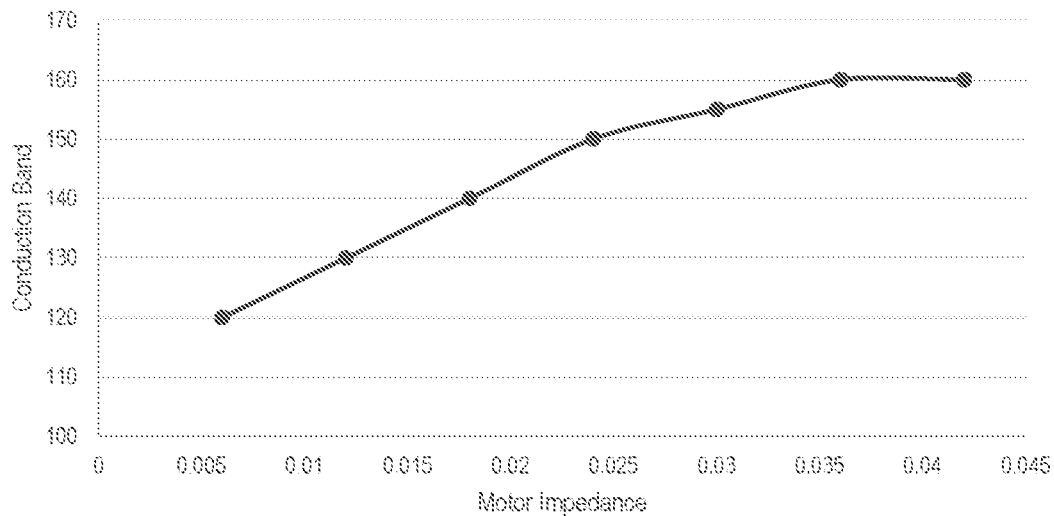
FIG. 11 is a graph depicting conduction band threshold values for motors having different impedance values when in use with a 120 ms) battery pack (e.g., 1P battery pack), according to an embodiment.
Figure 12:
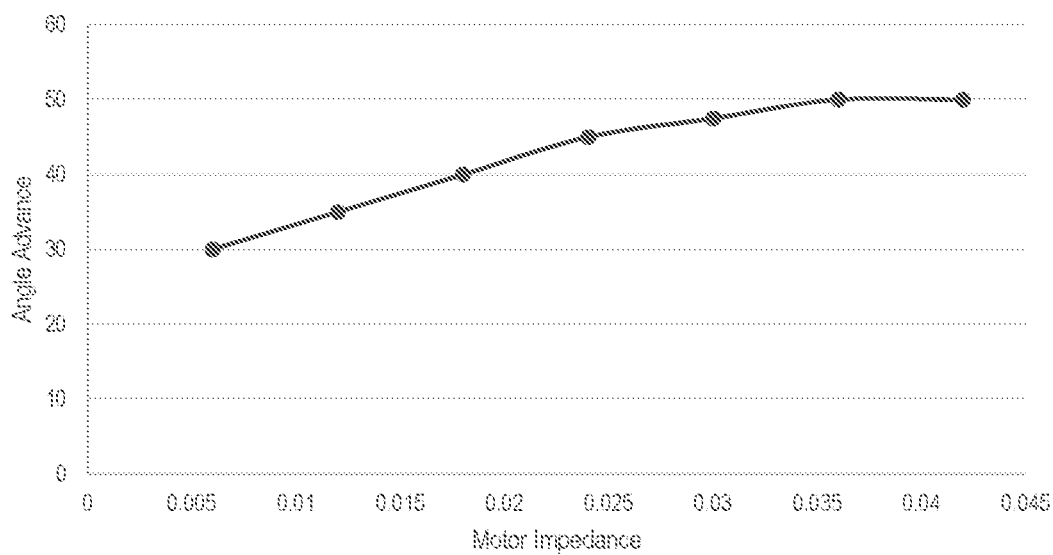
FIG. 12 is a graph depicting advance angle threshold values for motors having different impedance values when in use with the 120 ms) battery pack (e.g., 1P battery pack), according to an embodiment.

FIG. 11 is a graph depicting conduction band threshold values for motors 104 having different impedance values when in use with a 120 ms) battery pack (e.g., 1P battery pack 108a), according to an embodiment. FIG. 12 is a graph depicting advance angle threshold values for motors 104 having different impedance values when in use with the 120 ms) battery pack (e.g., 1P battery pack 108a), according to an embodiment. In an embodiment, as the motor 104 becomes larger and its impedance decreases, it becomes less suitable to operate at increased CBAA levels with a high impedance battery pack such as 1P battery pack 108a. In an embodiment, when using battery pack 108a, the motor 104 may be operated at a CBAA threshold value in the range of 120/30 degrees and 160/50 degrees based on the motor impedance value. It is noted that while the graphs of FIGS. 11 and 12 are constructed for a 120 ms) battery pack, similar graphs can be constructed for other battery packs with different impedance levels.

FIG. 13 is a table depicting different CBAA values for four power tools 100a-100d each capable of receiving battery packs 108a-d with different rated capacities, according to an embodiment. As shown here, and with continued reference to FIGS. 4, 7 and 8, each power tool 100a-100d is capable of receiving battery packs 108a-108d having the same rated voltage (e.g., 20V max and/or 18V nominal voltage) but different capacities. Each battery pack 108a-108d is provided with its own individual battery pack ID, which as described above, is detected by the power tool to identify the battery pack capacity. In an embodiment, the controller of each power tool is configured to set a conduction band and an advance angle value for operating the motor 104 based on the battery pack ID. This is done using a look-up table as exemplified in FIG. 13. The CBAA values for each motor 104 and each battery pack are pre-set according to comparative ratio of the motor impedance to the battery pack impedance, as described above.

For example, the controller of the circular saw 100a sets the CBAA to 150/45 degrees for the high-capacity battery packs 108d and 108c, but to 120/30 degrees for medium and low capacity battery packs 108b and 108a. The controller of the reciprocating saw 100b, which has the same-size motor as the circular saw 100a but higher power output requirements, sets the CBAA to 160/50, 150/45, 140/40 and 120/30 degrees for battery packs 108d, 108c, 108b and 108a, respectively. The motors in both these tools include a 7 ms) impedance and therefore are operated at the baseline CBAA of 120/30 degrees when using the low-capacity battery pack 108a.

In an embodiment, the motor 104 in the drill 100c has an impedance of 17 mΩ and therefore can be operated at CBAA of 140/40 degrees even with the low-capacity battery pack 108a. In an embodiment, the motor 104 in the grinder has an impedance of 13 mΩ and therefore can be operated at CBAA of 130/35 degrees with a low-capacity battery pack.

Figure 14:
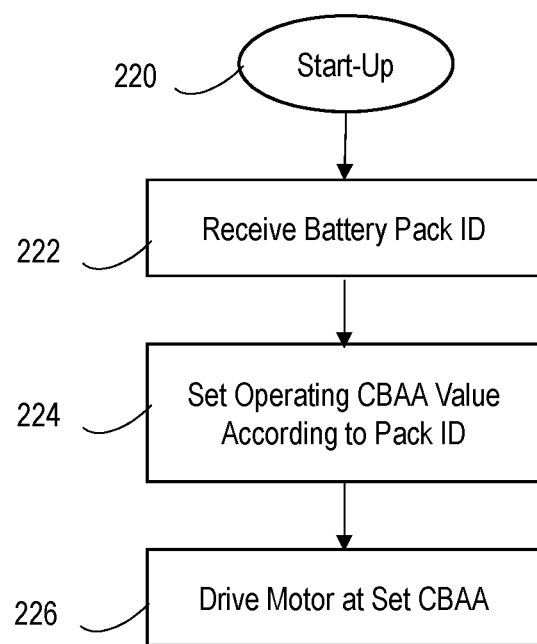
FIG. 14 depicts an exemplary simplified flowchart diagram executed by each power tool controller to set the operating conduction band and advance angle values of the respective power tool motor, according to an embodiment.

FIG. 14 depicts an exemplary simplified flowchart diagram executed by each power tool controller to set the operating CBAA of the respective power tool motor 104, according to an embodiment. In an embodiment, at tool start-up 220, the controller is configured to receive the battery pack ID at step 222. This is done, as described above, by measuring the capacitance of the battery pack capacitor and detecting the battery pack ID based on the measured capacitance. In step 224, the controller sets the operating CBAA of the motor 104 based on the battery pack ID using a look-up table. In an embodiment, the operating CBAA may refer to a fixed CBAA at which each phase of the motor 104 is commutated, or the maximum value of CBAA corresponding maximum speed in a variable CBAA speed control scheme. In step 226, the controller proceeds to control motor commutation at the set operating CBAA.

Figure 15:
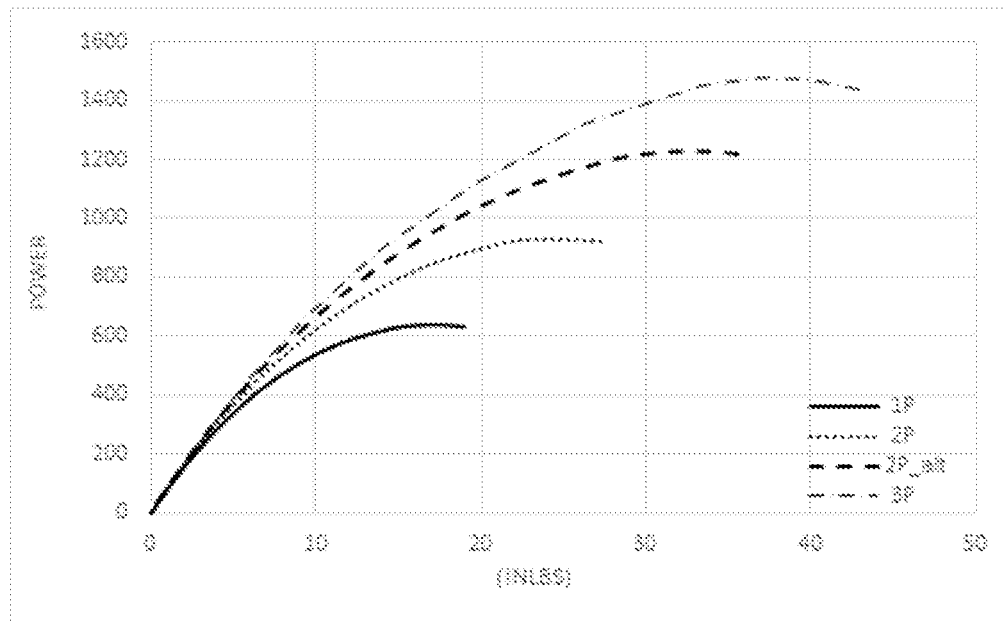
FIG. 15 is a graph depicting maximum power output of the motor in a power tool receiving different capacity battery packs, where the motor is operated at the baseline CBAA of 120/30 degrees for all battery packs, according to an embodiment.

FIG. 15 is a graph depicting maximum power output of the motor in a power tool receiving different capacity battery packs, where the motor 104 is operated at the baseline CBAA of 120/30 degrees for all battery packs, according to an embodiment.

Figure 16:
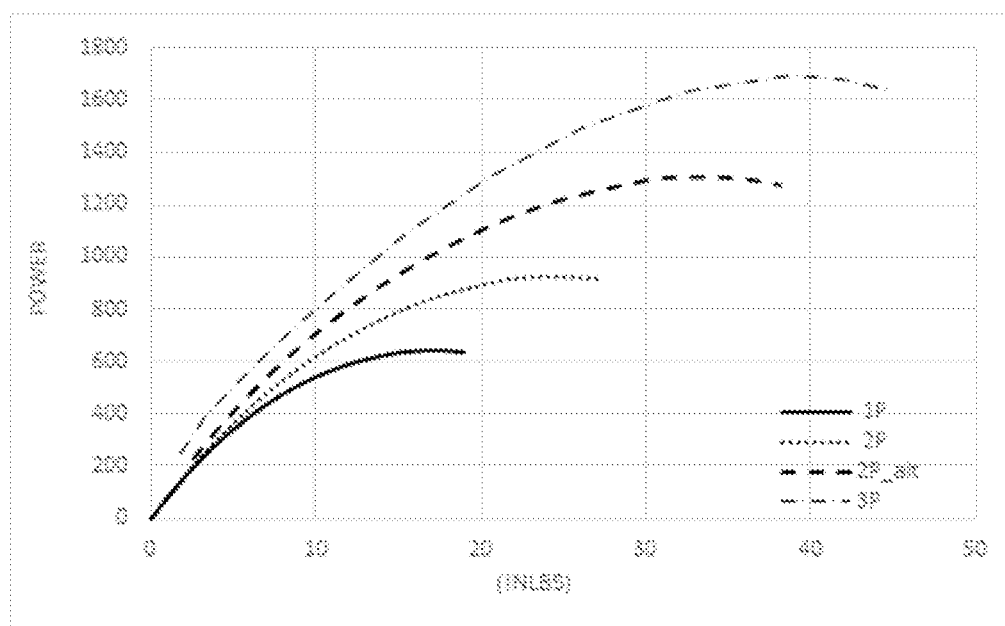
FIG. 16 is a graph depicting maximum power output of the motor in a power tool receiving different capacity battery packs, where the motor is operated at different operating CBAA values set according to battery pack ID, according to an embodiment.

FIG. 16 is a graph depicting maximum power output of the motor in a power tool receiving different capacity battery packs, where the motor 104 is operated at different operating CBAA values set according to battery pack ID, according to an embodiment.

Figure 17:
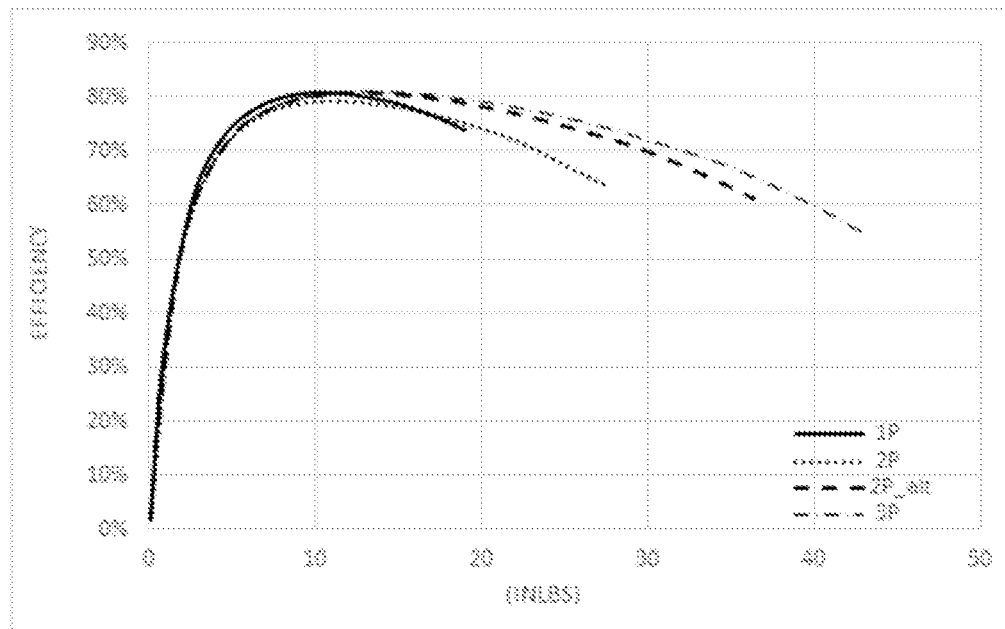
FIG. 17 is a graph depicting efficiency of the motor in the power tool receiving different capacity battery packs, where the motor is operated at the baseline CBAA of 120/30 degrees for all battery packs, according to an embodiment.

FIG. 17 is a graph depicting efficiency of the motor in the power tool receiving different capacity battery packs, where the motor 104 is operated at the baseline CBAA of 120/30 degrees for all battery packs, according to an embodiment.

Figure 18:
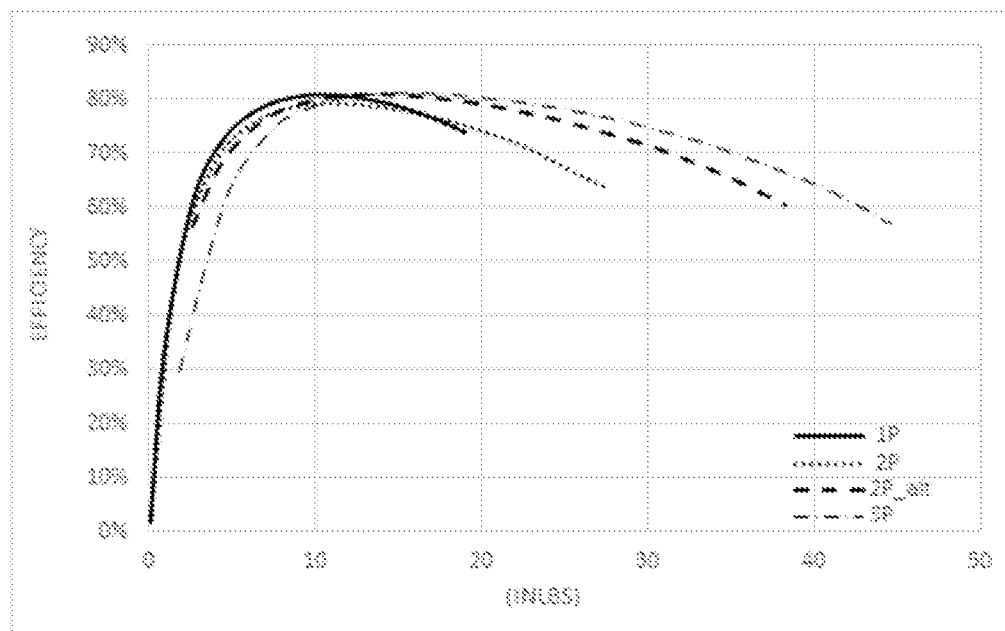
FIG. 18 is a graph depicting efficiency of the motor in the power tool receiving different capacity battery packs, where the motor is operated at different operating CBAA values set according to battery pack ID, according to an embodiment.

FIG. 18 is a graph depicting efficiency of the motor in the power tool receiving different capacity battery packs, where the motor 104 is operated at different operating CBAA values set according to battery pack ID, according to an embodiment.

As shown in FIGS. 15-18, the scheme presented in this disclosure maximizes power output and efficiency of the motor 104 from each battery pack without abnormally and frequently overheating the battery pack and pulling too much current from the battery pack beyond its capability. In particular, the scheme presented in this disclosure maximizes current draw from the higher capacity battery packs by increasing the motor operating CBAA, increasing the motor power output by approximately 10-15% and motor efficiency at maximum power output by approximately 2-6%. For lower capacity battery packs, however, the current draw is maintained at levels compatible with the battery pack capabilities by setting the motor operating CBAA to threshold values set according to the ratio of the motor impedance to the battery pack impedance.

It is noted that while in embodiments of this disclosure, the CBAA is set to a baseline value of 120/30 degrees and increase up to 160/50 degrees, these values are exemplary and other baseline and maximum CBAA values may be alternatively utilized. For example, a baseline CBAA of 90/0 degrees may be utilized for battery packs having higher impedances that the packs shown in FIG. 7 and/or motors 104 having lower impedances than the motors 104 shown in FIG. 8 of this disclosure.

It is also noted that all the speed, torque, and power parameters and ranges shown in any of these figures and discussed above are exemplary by nature and are not limiting on the scope of this disclosure. While some power tools may exhibit similar performance characteristics shown in these figures, other tools may have substantially different operational ranges.

Some of the techniques described herein may be implemented by one or more computer programs executed by one or more processors, controllers and/or control units residing, for example on a power tool. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power tool comprising:
   a housing;
   a motor disposed within the housing, the motor including a stator having a plurality of phases and a rotor rotatably driven relative to the stator;
   a battery receptacle arranged to be selected and removably coupled to one of a first battery pack having a first rated capacity and a second battery pack having a second rated capacity higher than the first rated capacity;
   a power switch circuit disposed between the battery receptacle and the motor; and
   a controller that controls the power switch circuit to drive the motor over a plurality of conduction bands associated with the plurality of phases of the stator, wherein the controller is configured to set at least one of the conduction band or an advance angle by which each phase of the motor is shifted to a first value when receiving the first battery pack and to a second value when receiving the second battery pack, wherein the second value is greater than the first value such that current draw from the first battery pack is more limited than current draw from the second battery pack.

2. The power tool of claim 1, wherein the controller sets the conduction band to the second value of less than 140 degrees when receiving the second battery pack and to the first value of approximately 140 to 160 degrees when receiving the first battery pack.

3. The power tool of claim 1, wherein the controller sets the advance angle to the second value of less than 40 degrees when receiving the second battery pack and to the first value of approximately 40 to 50 degrees when receiving the first battery pack.

4. The power tool of claim 1, wherein the controller is further configured to set a current limit corresponding to a maximum operating current of the motor to a first current threshold when receiving the first battery pack and to a second current threshold when receiving the second battery pack, wherein the second current threshold is greater than the first current threshold such that current draw from the first battery pack is more limited than current draw from the second battery pack.

5. A system comprising:
   a set of removable battery packs each including a plurality of battery cells; and
   a set of power tools each comprising a motor having a stator, a controller, a power switch circuit, and a battery receiving portion, wherein the controller controls the power switch circuit to drive the motor over a plurality of conduction bands associated with a plurality of phases of the motor;
   wherein, for each power tool, the controller is configured to identify a type of battery pack coupled to the battery receiving portion and set the conduction band based on the identified type of the battery pack, wherein the controller is configured to set the conduction band to a first value when receiving a first battery pack of the set of removable battery packs and to a second value when receiving a second battery pack of the set of removable battery packs.

6. The system of claim 5, wherein the first battery pack has a higher rated capacity than the second battery pack and the first value is greater than the second value such that current draw from the first battery pack is less limited than current draw from the second battery pack.

7. The system of claim 6, wherein in a first power tool of the set of power tools, the controller sets the conduction band to the second value of approximately equal to 120 degrees when receiving the second battery pack and to the first value of approximately 140 to 160 degrees when receiving the first battery pack.

8. The system of claim 7, wherein in a second power tool of the set of power tools, the controller sets the conduction band to the second value of greater than 120 degrees when receiving the second battery pack and to the first value of approximately 140 to 160 degrees when receiving the first battery pack.

9. The system of claim 5, wherein the greater a ratio of an impedance of the motor to an impedance of the battery pack, the lower the conduction band set by the controller such that for a given battery pack of the set of removable battery packs, the lower the impedance of the motor, the more current the motor is able to draw from the given battery pack.

10. A system comprising:
    a set of removable battery packs each including a plurality of battery cells; and
    a set of power tools each comprising a motor having a stator, a controller, a power switch circuit, and a battery receiving portion, wherein the controller controls the power switch circuit to drive the motor over a plurality of conduction bands associated with a plurality of phases of the motor and set an advance angle by which each phase of the motor is shifted;
    wherein, for each power tool, the controller is configured to identify a type of battery pack coupled to the battery receiving portion and set the advance angle based on the identified type of the battery pack, wherein the controller is configured to set the advance angle to a first value when receiving a first battery pack of the set of removable battery packs and to a second value when receiving a second battery pack of the set of removable battery packs.

11. The system of claim 10, wherein the first battery pack has a higher rated capacity than the second battery pack and the first value is greater than the second value such that current draw from the first battery pack is less limited than current draw from the second battery pack.

12. The system of claim 11, wherein in a first power tool of the set of power tools, the controller sets the advance angle to the first value of approximately equal to 120 degrees when receiving the second battery pack and to the first value of approximately 40 to 50 degrees when receiving the first battery pack.

13. The system of claim 12, wherein in a second power tool of the set of power tools, the controller sets the advance angle to the second value of greater than 30 degrees when receiving the second battery pack and to the first value of approximately 40 to 50 degrees when receiving the first battery pack.

14. The system of claim 10, wherein the greater a ratio of an impedance of the motor to an impedance of the battery pack, the lower the advance angle set by the controller such that for a given battery pack of the set of removable battery packs, the lower the impedance of the motor, the more current the motor is able to draw from the given battery pack.

* * * * *